United States Patent [19]
Rappen

[11] Patent Number: 5,131,530
[45] Date of Patent: Jul. 21, 1992

[54] SLIDE CUSHION TO ABSORB SHOCKS AND TO SUPPORT CONVEYING BELTS

[75] Inventor: Albert Rappen, Mulheim an der Ruhr, Fed. Rep. of Germany

[73] Assignee: VSR Engineering GmbH, Mulheim an der Ruhr, Fed. Rep. of Germany

[21] Appl. No.: 584,535

[22] Filed: Sep. 18, 1990

[30] Foreign Application Priority Data

Sep. 21, 1989 [DE] Fed. Rep. of Germany ....... 3931439

[51] Int. Cl.$^5$ ............................................. B65G 15/60
[52] U.S. Cl. .................................................. 198/841
[58] Field of Search ........................................ 198/841

[56] References Cited

U.S. PATENT DOCUMENTS

| | | | |
|---|---|---|---|
| 3,200,940 | 8/1965 | Higgins | 198/841 X |
| 3,265,192 | 8/1966 | Stadelman | 198/841 X |
| 3,703,284 | 11/1972 | Hesen | 198/841 X |
| 3,800,938 | 4/1974 | Stone | 198/841 |
| 4,206,994 | 6/1980 | Silverberg et al. | 198/841 X |
| 4,215,776 | 8/1980 | Esler | 198/841 X |
| 4,222,482 | 9/1980 | Kelley | 198/841 X |
| 4,616,822 | 10/1986 | Trulaske et al. | 198/841 X |
| 4,793,470 | 12/1988 | Anderson | 198/841 X |
| 4,898,272 | 2/1990 | Swinderman et al. | 198/841 |

FOREIGN PATENT DOCUMENTS

| | | | |
|---|---|---|---|
| 2518776 | 11/1976 | Fed. Rep. of Germany | 198/841 |
| 0579193 | 11/1977 | U.S.S.R. | 198/841 |
| 1423467 | 9/1988 | U.S.S.R. | 198/841 |
| 1426896 | 9/1988 | U.S.S.R. | 198/841 |

*Primary Examiner*—D. Glenn Dayoan
*Attorney, Agent, or Firm*—Felfe & Lynch

[57] ABSTRACT

A slide cushion for absorbing shocks and supporting conveying belts, particularly at conveying belt transfers, with at least one lengthways oriented base plate and at least one supporting plate, whereby the base plate is furnished with a sliding surface layer and at least one elastic shock absorbing layer, a universal employment and a simple carrying out of servicing and replacement of worn parts is possible in that the base plate and the supporting plate are furnished with corresponding projections and indentations and the base plate is attached to the supporting plate in a form-locking and detachable manner. At the same time the supporting plate can, by means of the opposing longitudinal and lateral stays which lock and clamp together, fit in an optimal position under the conveying belt.

6 Claims, 2 Drawing Sheets

SLIDE CUSHION TO ABSORB SHOCKS AND TO SUPPORT CONVEYING BELTS

BACKGROUND OF THE INVENTION

The invention relates to a slide cushion to absorb shock and to support conveying belts, in particular at transfer points, with at least one lengthways extended base plate and at least one supporting plate, in which case the base plate consists of a sliding surface layer and at least one elastic shock absorption layer.

When coarse pieces of bulk material are transferred to a conveying belt from loaders, the corners of the material either press the conveying belt down considerably and thus damage it or the impact forces are absorbed by the rollers supporting the conveying belt, which are usually arranged at specific distances from one another and which are damaged in this manner and must therefore be replaced regularly.

Precisely because in the area of the loading of bulk goods, the edges of a conveying belt sag so that it is difficult to seal the undulating contours of the conveying belt over against the rigid loader by means of an elastic skirt, the lower edge of which must follow this changing contour.

The problems discussed can be solved by the conveying belt's being supported from below by an elastic system which absorbs shocks and which steers the conveying belt. Such shock absorbing and supportive systems can also be employed to cushion shocks of any sort directed against a solid base plate. For example, a supportive system consisting of elastic material with a rigid surface capable of sliding of the prior art is described in the pamphlet, GUARDABELT, BARRES D'IMPACT, from the Martin Engineering Company. In this case metallic tracks are attached to the base plate either by vulcanization or molding or the base plate is glued to or vulcanized onto U-shaped metal tracks, which envelop the rigid, lengthways oriented frame construction which bears the conveying belt and which is attached to this at the sides. The attachment of this elastic base plate to the supporting plate is very complicated. The elastomer-metal combination also leads to difficulties during its production or the structure can break apart during operation.

Supporting plates or attachment tracks that are firmly embedded in the base plate have a considerable height so that they can hold the bolt head required in the assembly. This height increases the total height of the slide cushion considerably. As a result, a high consumption of elastomer material is also involved. By means of the differing capability for deformation of the thinner middle and thicker edge zones that the base plate may display, the bearing capability is distributed unevenly. Due to this, there is, on the one hand, an irregular abrasion and, on the other hand, a differing temperature load.

Furthermore, the base plates can under no circumstances be removed and the supporting plate can only be detached from the side or from underneath, so that it is not possible to mount a slide cushion over a large surface that is accessible respectively only from the front or the side.

SUMMARY OF THE INVENTION

The task of this invention is avoiding the disadvantages demonstrated above and to so construct and develop a slide cushion to absorb shock and to support a conveying belt that a universal application is possible and to make respectively servicing light and the replacement of worn parts easy. Furthermore, an easy method of production and a limited height are desirable.

The slide cushion to absorb shocks and to provide support according to the invention, in which task as described above is resolved is, above all, and in essence characterized in that the ground plate and the supporting plate are furnished with corresponding projections and indentations and the base plate is attached to the supporting plate in a manner that is form-locking but is also capable of being detached.

The present invention is based on the basic principle of attaching the base plate to the supporting plate in such a manner that it can be detached independently of the supporting plate, so that the latter may be an expendable part or, under changing conditions of use, which require other constructional features of the base plate, whereby, however, an assured absorption of the friction thrust forces occurring is guaranteed. Slide cushions according to the invention are characterized among other features by a low height, a low wear and tear and low manufacturing costs.

The above-mentioned construction pieces according to the invention as well as those claimed and those described in the embodiments are not subject to any particular exceptional circumstance with regard to their size, their shape, the choice of material and technical conception so that the known criteria of selection for each field of application enjoy unrestricted employment.

There are then different opportunities for designing and for the further development the principle of the invention, for which purpose attention is drawn, on the one hand, to the subclaims and on the other hand, to the following explication of the preferred embodiments of the slide cushion according to the invention to absorb shocks and to support the conveying belt.

For a better understanding of the invention, together with other and further objects thereof, reference is made to the following description, taken in connection with the accompanying drawings, and its scope will be pointed out in the appended claims.

In accordance with the invention, a slide cushion to absorb shocks and to support conveying belts, particularly at conveying belt transfers, comprises at least one lengthways-oriented base plate and at least one supporting plate, in which the base plate includes a sliding surface layer and at least one shock absorbing layer. The base plate and the supporting plate are furnished respectively with corresponding projections and indentations and the base plate is attached in a form-locking and detachable manner to the supporting plate.

BRIEF DESCRIPTION OF THE DRAWINGS

Referring now to the drawings.

DETAILED DESCRIPTION OF THE PREFERRED EMBODIMENT

Figure 1:
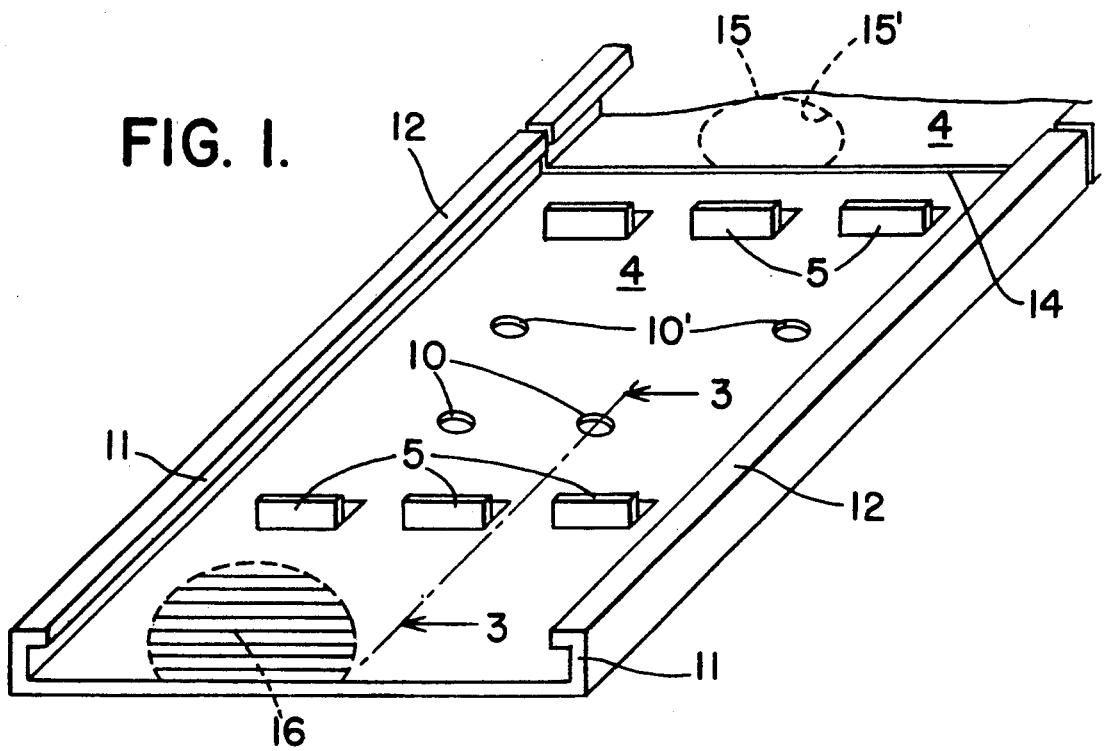
FIG. 1 is a supporting plate of a slide cushion according to the invention in a perspective, schematic representation.
Figure 3:
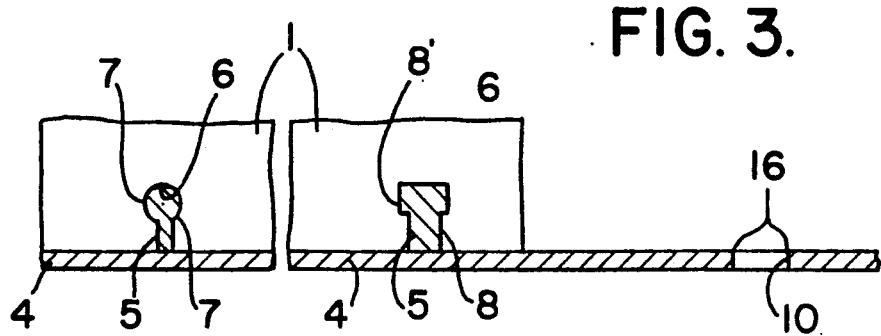
FIG. 3 is, schematically, a section through a part of the object according to FIG. 1 along the line 3—3.

The slide cushion according to the invention to absorb shocks and to support the conveying belt consists, in the first place, of a base plate 1, which displays a sliding surface layer 2 and at least one absorption layer 3 and, secondly, of a supporting plate 4. Such a supporting plate is represented in FIG. 1. It displays projections formed as vertical crosspieces that correspond with indentations in the base plate 1, which preferably form vertical slots 6. According to the invention, the base plate 1 is attached in a form-locking manner to the supporting plate 4 and can be detached. The fitting of the base plate preferably ensues in such a manner that the base plate is laid in place from above, slightly tilted and with the elastic pressing together of the base plate, edges are pushed in diagonally. Such a form-locking connection can among other methods be supported in that respectively the projections or the vertical crosspieces 5 are furnished at their ends with thickened tips and/or teeth 8 and the respective corresponding indentations or vertical slots display corresponding rear notches 7', 8', as emerges especially clearly in FIG. 3. In such an arrangement of the slide cushion according to the invention a shift between the base plate 1 and the support plate 4 as a result of the impact of forces due to a conveyor belt dragging over the base plate 1 can be reliably avoided. According to the invention the supporting plate 4 is above all connected to a supporting structure which bears it and subsequently the base plate 1 is pushed onto the supporting plate 4.

As a result of the conveying belt, which is not shown here, a certain degree of wear and tear occurs regularly to the surface of the base plate 1. In order to maintain this wear and tear at the lowest possible level, the sliding surface layer 2 of the base plate 1 consists of a hard, wear resistant, slidable and elastic material.

It is of advantage that the shock absorbing section 3 of the base plate 1 consists of cellular elastomer. The elastic behavior of an elastomer is suited, in a particular manner, to absorb safely the jolts on the conveying belt caused through the loading of material. The arrangement of the individual cells in the cellular elastomer employed should preferably be so chosen that a compression leads to hardly any deformation in a transverse direction. Both natural rubber and the most various synthetic forms of rubber are suitable as elastomers. It is particularly advantageous if the base plate I displays several—at least two—different shock absorbing sections 3, 3', especially those of differing cellularity.

The wear and tear of the slide cushion according to the invention can be further reduced by having the shock absorbing layer 3 or layers 3, 3', chamfered or rounded off at least at one end of the base plate, in order to allow the conveying belt a "soft meeting" with the sliding surface layer 2 of the base plate 1. It is clear that the shielding surface layer 2 in this area is correspondingly bent or curved.

Figure 2:
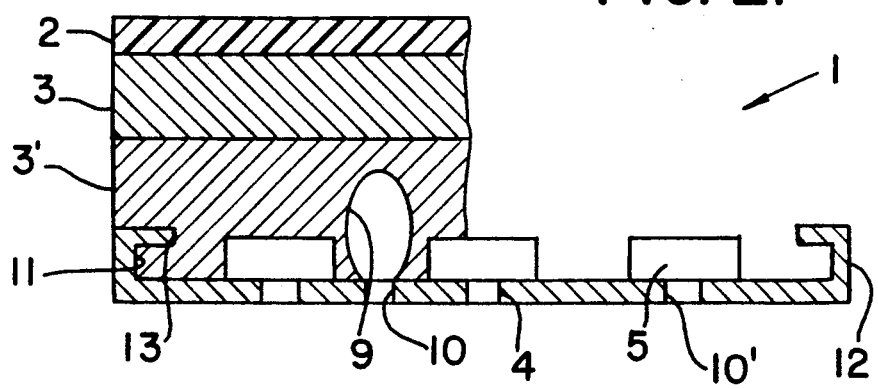
FIG. 2 is a front elevation of a slide cushion according to the invention with the base plate shown only in part and represented in a vertical section.

According to a further principle of the invention, lengthways-oriented grooves are provided respectively for the shock absorbing layers 3 or the shock absorbing layers 3, 3', of the base plate 1. These lengthways oriented grooves 9 can display either a triangular or club-shaped cross section, as can be clearly perceived in FIG. 2. The lengthways oriented grooves serve, on the one hand, to increase the compressibility of the lower shock absorbing layer 3, of the base plate 1 and, on the other hand, for the better conductance of the heat caused as a result of energy produced by the inner shock absorption. In a particular embodiment, the shock absorbing layer can consist of an elastomer material that has only the lengthways-oriented grooves and is particularly compressible in their vicinity and so possesses differing elasticity in its height, instead of a cellular elastomer. A further arrangement of the invention is intended that the supporting plate 4 is furnished with openings near the lengthways oriented grooves 9 of the base plate 1 in order to pipe in cooling air. Such a novel process makes possible for the first time an "active carrying off of heat" from the interior of a slide cushion for shock absorption and for support, particularly in the case of extreme compression and decompression.

Figure 4:
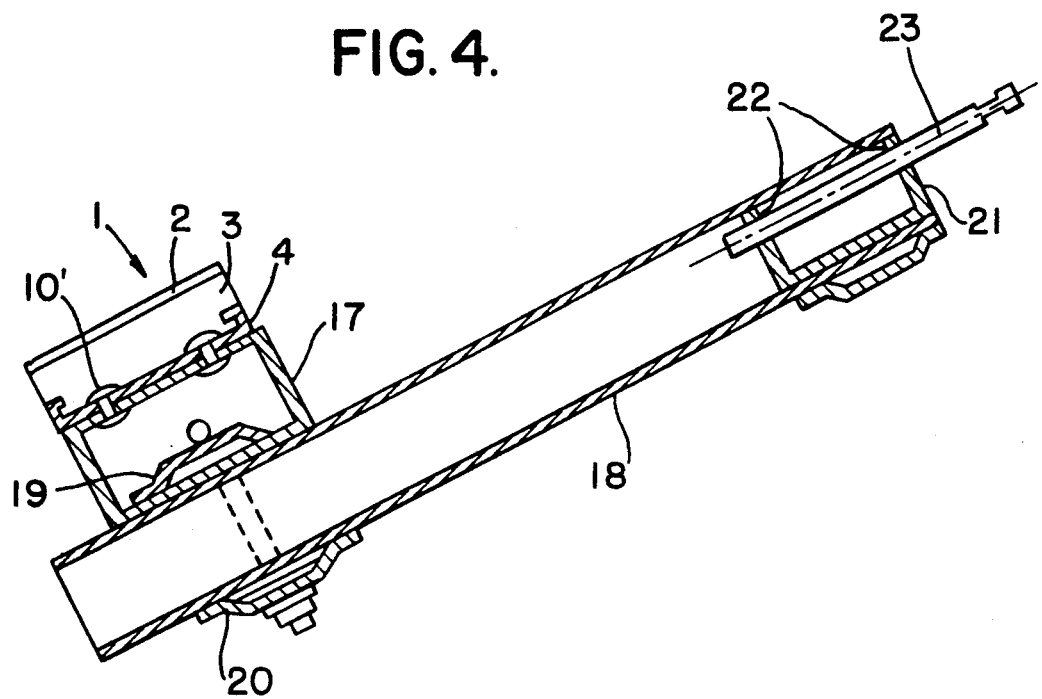
FIG. 4 is a lay-out of the slide cushion according to the invention in a first embodiment.

It is evident from FIG. 1 that the supporting plate 4 has been furnished with drill holes 10' for the accommodation of means of attachment—not shown—to a supportive structure. Such a connection is represented in FIG. 4.

It is particularly appropriate that the supporting plate 4 possesses lengthwise-oriented guideways 11, in order to provide lateral guide ways and/or to hold down the base plate 1. In the embodiments described and thus preferred, these lengthways-oriented grooves 11 are so arranged that the side edges 12 are twice folded and project into the corresponding lengthways-oriented grooves 13 of the base plates 1. That the lengthwise-oriented guideways can also press into the elastic side surfaces by means of the preferred double folding, a separation of the base plate from the supporting plate 4 can be reliably avoided. In the case of several supporting plates 4 arranged one behind the other, it is of advantage if the supporting plates 4 so arranged are furnished at their impact edges 14 with respectively corresponding projections 15 or rear indentations 15', as is indicated in broken lines in FIG. 1. That a longitudinal displacement of the base plate 1 along the one or more fixed supporting plates is safely avoided, the necessary definitive shape is provided for respectively by the lateral crosspieces 5 or the lateral grooves 6, which is given both laterally and vertically by the lengthways-oriented guideways 11. FIG. 1 makes it clear that lateral crosspieces are formed by punched out tongues that are bent to about 90° from the supporting plate. But it is just as possible that the bending of the crosspieces is to a lesser degree, in order to make possible the pushing back of the base plate 1 through the lengthways-oriented grooves 11 of the supporting plate 4 in one direction. In terms of advantage, the direction should correspond to the opposite direction of the conveyance.

In order to obtain an even stop for the partly elastic base plate 1 with regard to the supporting plate 4, either one or both of the surfaces lying opposite each other of the supporting plates 4 and the base plate can be mechanically roughened. This can take place, on the one hand, by means of a lateral rippling 16 only suggested in FIG. 1 or by means of other projections. It is, for instance, plausible that as the openings 10 are punched or drill holes are made, a circulating burr 16, points upward and serves to increase the friction between the base plate 1 and the supporting plate 4.

It is particularly advantageous when the supporting plate 4 and the base plate 1 display the same width. In this manner, it is possible by means of the arrangement of a number of slide cushions according to the invention together, large shock absorption and supporting surfaces, for example, for ships' berths, can be constructed.

Figure 5:
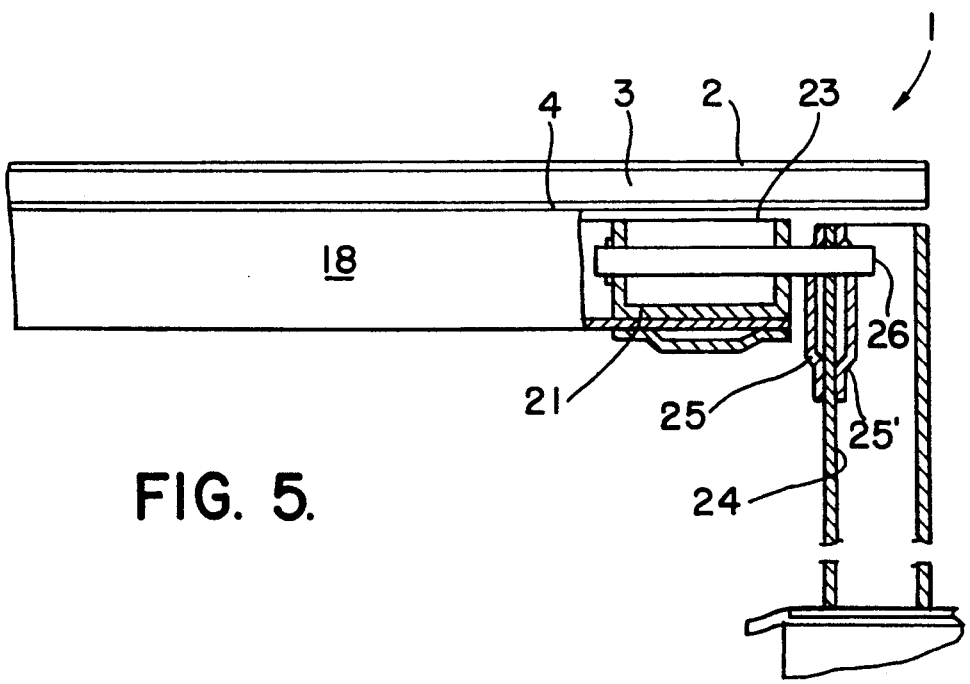
FIG. 5 is a lay-out of a slide cushion according to the invention in a further embodiment.

FIG. 4 and 5 show preferred arrangements of the slide cushion according to the invention, here with the aid of assembly stays at the conveying belt transfer. The bending strength of the slide cushion can be achieved by attaching the supporting plate 4 to a longitudinal stay 17 with a high bending strength. As several slide cushions are generally assembled next to each other, it is expedient to attach the longitudinal stays to their common lateral crosspieces 18. In the case of a universal application, it is expedient that the longitudinal stay 17 and the lateral stay 18 are attached to each other in such a manner that they can be moved in two directions relative to each other. C-profiles serve preferably as longitudinal stays 17 and lateral stays 18, whereby their attachment to each other is achieved by means of a clamping device consisting of a pressure plate 19 and a counter plate 20. Such an arrangement allows a high degree of adaptability to various conveying belt forms and widths.

It is, furthermore, evident from FIG. 4 that the crosspiece 18 is furnished at one end with a slidable and clampable mounting 21, which possesses several paired tenon holes 22 for receiving tenons 23. This advantageous arrangement makes it possible to hang several slide cushions according to the invention which are attached to each other in the existing openings in the supporting structure for the usual conveying belt rollers. In this manner, a belated installation of slide cushions according to the invention to absorb shocks and to support an optional part of an already installed conveying belt.

Finally, provision has been made in the further development of the invention that each longitudinal stay 17 is furnished at its ends with a mount 21. Such a mount in the arrangement represented in FIG. 5 makes it possible that the end of each of the longitudinal stays 17 can be revolvably suspended in corresponding props 24. Preferably, plates 25, 25', with a corresponding indentations 26 for receiving tenons 23 are additionally provided for. In this manner it is possible to create a support for the trough-shaped conveying belt, in which case the sliding surface layers 2 of the slide cushion according to the invention sits tangentially closely to the bow shaped underside of the conveying belt. Such an elegant and complete support for the whole under-surface was, up to now, inconceivable as a result of the presence of the roller axle. A bent-shaped lateral stay corresponding to the trough-shaped form of the conveying belt which can serve to bear the revolvably-mounted longitudinal stay 17 is not represented.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Slide cushion to absorb shocks and to support conveying belts, particularly at conveying belt transfers, comprising: at least one lengthways-oriented base plate and at least one supporting plate, in which the base plate includes a sliding surface layer and at least one elastic shock absorbing layer, the supporting plate and the base plate being furnished respectively with corresponding upstanding projections and indentations and the base plate being attached in a form-locking and detachable manner to the supporting plate, the slide cushion including crosspieces serving as projections on the supporting plate and lateral grooves serving as indentations in the base plate, the crosspieces having at their ends thickenings and teeth, and corresponding indentations having corresponding rear slots.

2. Slide cushion to absorb shocks and to support conveying belts, particularly at conveying belt transfers, comprising: at least one lengthways-oriented base plate and at least one supporting plate, in which the base plate includes a sliding surface layer and at least one elastic shock absorbing layer, the supporting plate and the base plate being furnished respectively with corresponding upstanding projections and indentations and the base plate being attached in a form-locking and detachable manner to the supporting plate, the slide cushion including crosspieces serving as projections on the supporting plate and lateral grooves serving as indentations in the base plate, the base plate having a sliding surface layer comprising a hard, wear resistant, slidable and elastic material, the base plate including a shock absorbing layer comprising a cellular elastomer, the base plate including two shock absorbing layers of differing cellularity, one of said shock absorbing layers of the base plate having longitudinal grooves, the supporting plate having openings allowing introduction of cooling air to the area of longitudinal grooves of the base plate.

3. Slide cushion to absorb shocks and to support conveying belts, particularly at conveying belt transfers, comprising: at least one lengthways-oriented base plate and at least one supporting plate, in which the base plate includes a sliding surface layer and at least one elastic shock absorbing layer, the supporting plate and the base plate being furnished respectively with corresponding upstanding projections and indentations and the base plate being attached in a form-locking and detachable manner to the supporting plate, the slide cushion including supporting plates, ordered one after the other, having impact edges with corresponding projections and rear indentations on their impact edges.

4. Slide cushion to absorb shocks and to support conveying belts, particularly at conveying belt transfers, comprising: at least one lengthways-oriented base plate and at least one supporting plate, in which the base plate includes a sliding surface layer and at least one elastic shock absorbing layer, the supporting plate and the base plate being furnished respectively with corresponding upstanding projections and indentations and the base plate being attached in a form-locking and detachable manner to the supporting plate, the slide cushion including a longitudinal stay with a high resistance to being bent and attached to a lateral stay, the supporting plate being connected to the longitudinal stay, the lateral stay having at an end thereof a slidable clamping device for clamping together the longitudinal and lateral stays.

5. Slide cushion according to claim 4, in which the clamping device has a plurality of paired tenon holes for receiving tenons for hanging the slide cushion on a supporting structure.

6. Slide cushion according to claim 5, which includes props and plates with corresponding indentations for receiving said tenons.

* * * * *